United States Patent [19]

Steigelmann

[11] 4,446,852

[45] May 8, 1984

[54] TERRACED SOLAR ENERGY COLLECTOR

[75] Inventor: William H. Steigelmann, Cherry Hill, N.J.

[73] Assignee: En-Save, Inc., Cherry Hill, N.J.

[21] Appl. No.: 291,422

[22] Filed: Aug. 10, 1981

[51] Int. Cl.³ .............................................. F24J 3/02
[52] U.S. Cl. ................................... 126/432; 126/448; 126/450; 126/449
[58] Field of Search ............... 126/432, 436, 438, 449, 126/448, 417, 450

[56] References Cited

U.S. PATENT DOCUMENTS

| | | | |
|---|---|---|---|
| 2,705,948 | 4/1955 | Rostock | 126/438 |
| 3,145,707 | 4/1958 | Thomason | 126/271 |
| 3,236,294 | 11/1961 | Thomason | 165/48 |
| 3,270,739 | 7/1960 | Thomason | 126/271 |
| 3,314,414 | 4/1967 | Rowekamp | 126/432 |
| 3,886,998 | 9/1973 | Rowekamp | 165/2 |
| 3,910,253 | 10/1975 | Thomason | 126/271 |
| 3,931,806 | 1/1976 | Hayes | 126/400 |
| 4,003,364 | 1/1977 | Balkus | 126/438 |

Primary Examiner—James C. Young
Assistant Examiner—Noah Kamen
Attorney, Agent, or Firm—Donald R. Piper, Jr.

[57] ABSTRACT

The present invention relates to a solar energy collector comprising a plurality of elongated heat-absorbing troughs. The elongated heat-absorbing troughs are supported in a generally parallel side-by-side terraced array, in position to retain liquid and with an end of each trough elevated relative to the other end to permit a liquid flow by gravity toward the respective lower ends thereof. The terraced array of troughs is oriented toward to the sun to permit the impingement of solar radiation upon the troughs. Heat-absorbing liquid is introduced into the troughs at the upper ends thereof to produce a flow of the heat-absorbing liquid toward the respective lower ends, with the heat-absorbing liquid becoming heated by the exposure to solar radiation. The heat-absorbing liquid is then collected from the troughs at the lower ends thereof.

9 Claims, 3 Drawing Figures

TERRACED SOLAR ENERGY COLLECTOR

BACKGROUND OF INVENTION

The present invention relates to solar energy collectors and, more particularly, to solar energy collectors utilizing thermal collecting liquid.

With a conventional type thermal pond solar energy collector, a shallow pond of thermal collecting liquid such as water is constructed on a generally horizontal surface such as the ground with the thermal collecting liquid being utilized to store heat from impinging solar radiation. The thermal collecting liquid which also serves as a storage medium is warmed by contact with a heat-absorbing surface exposed to solar radiation. However, due to the relatively acute angle of the incident solar rays, especially during the winter time, the thermal storage liquid in the pond is not effectively or efficiently heated.

Another problem encountered with conventional thermal pond solar energy collectors is that the thermal collecting liquid remains stagnant in the pond during exposure to solar radiation, creating weight problems for the supporting structure. In addition, if the heat-absorbing surface over which the heat collecting liquid flows is inclined toward the sun to increase the incident angle of the solar radiation and to also alleviate the weight problems by causing the liquid to flow rather than remain stagnant in a pond, the thermal collecting liquid does not remain in contact with the heat-absorbing surface for a sufficient period of time to permit the thermal collecting liquid to become efficiently or effectively heated.

In accordance with the present invention, a thermal pond solar energy collector is provided that alleviates the weight problems associated with conventional thermal pond solar energy collectors while still permitting the thermal collecting liquid to be efficiently and effectively heated.

SUMMARY OF INVENTION

The present invention provides a solar energy collector comprising a plurality of elongated heat-absorbing troughs. Support means is provided for supporting the troughs in a generally parallel side-by-side terraced array. The troughs are supported in position to retain liquid and with an end of each trough elevated relative to the other end to permit a liquid flow by gravity toward the respective lower ends thereof. In use, the troughs are positioned so that heat-absorbing liquid introduced into the heat absorbing troughs is exposed to solar radiation to increase the temperature of the heat-absorbing liquid. The heat-absorbing liquid functions not only to collect heat from the solar radiation but also functions as a storage medium for the heat. Feed means is included for introducing the heat-absorbing liquid into said troughs disposed in said array at the upper ends thereof to permit a flow of the heat-absorbing liquid toward the respective lower ends at a slow rate. Collection means is provided for collecting the heat-absorbing liquid from said troughs disposed in said array at the lower ends thereof.

BRIEF DESCRIPTION OF THE DRAWINGS

In order to more completely understand the solar energy collector in accordance with the present invention, a preferred embodiment is illustrated by the appended drawings in which.

DESCRIPTION OF THE PREFERRED EMBODIMENT OF THE PRESENT INVENTION

Figure 1:
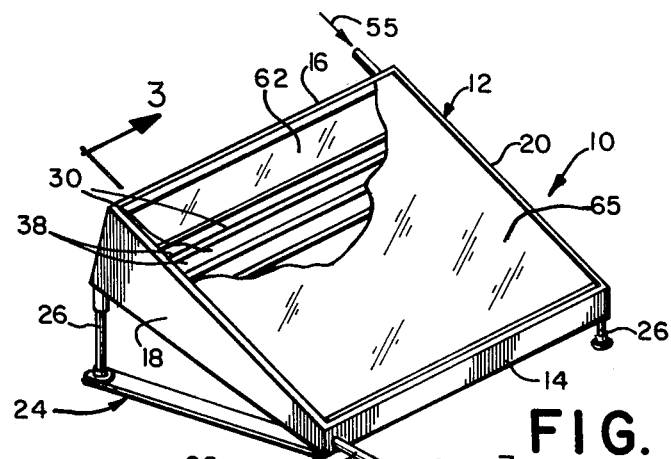
FIG. 1 is a perspective view, partially cut away, of a solar energy collector in accordance with a preferred embodiment of the present invention.
Figure 3:
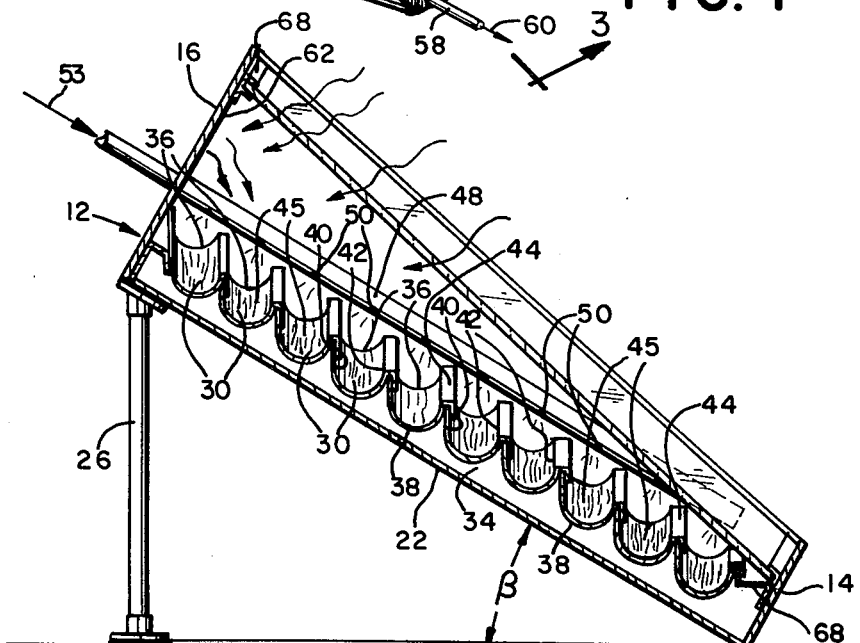
FIG. 3 is a cross-sectional view of the solar energy collector taken along line 3—3 of FIG. 1.
Figure 2:
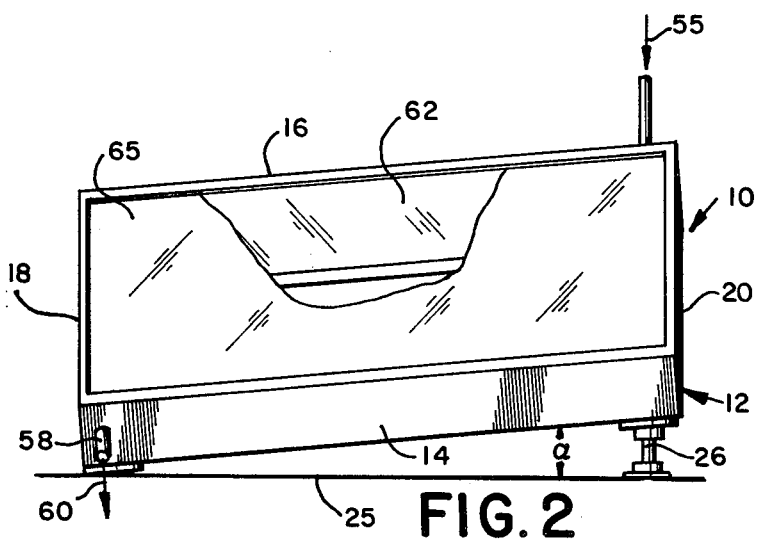
FIG. 2 is a front elevational view, partially cut away, of the solar energy collector illustrated in FIG. 1.

Referring to FIGS. 1, 2, and 3, the solar energy collector, generally represented at 10, includes an insulating housing having a front wall 14, back wall 16, opposing side walls 18 and 20, and a bottom panel 22. The respective walls and bottom panel of the housing comprise an insulating material to minimize heat loss during operation of the solar energy collector.

The housing 12 is supported from below by supporting structure 24 which positions the bottom panel 22 of the housing in a vertically inclined position relative to a horizontal reference plane 25. The supporting structure 24 includes support members or legs 26 which at one end engage the support surface on which the solar energy collector is disposed and at the opposing ends support the bottom panel 22 of the housing at its respective corners. Preferably, the support members 26 are adjustable in length so that the bottom panel 22 of the housing can be vertically inclined into various selected orientations relative to the horizontal reference plane 25. The support legs 26 are respectively adjusted so that the back wall 16 of the housing is elevated relative to the front wall 14 and so that a selected side wall 20 is elevated relative to the opposing side wall 18.

The solar heat collector 10 comprises a plurality of elongated heat-absorbing troughs 30 advantageously constructed of aluminum. The troughs are individual units and are each removably positionable within the housing so that the troughs can be more easily transported to the site of assembly than one large heat-absorbing surface. The heat-absorbing troughs are respectively supported within the housing on a form 34, preferably of foamed polystyrene or other similar material disposed on the upper surface of the bottom panel 22 of the housing. The upper surface of the molded form 34 of foamed polystyrene is properly shaped and dimensioned so as to respectively engage the bottom surfaces of the heat-absorbing troughs, with each trough being removably engageable therewith. The molded form 34 not only functions with the housing 12 and the supporting structure 24 as support means to support and retain the troughs in proper position within the housing, but the molded form 34 also serves to insulate the troughs from the bottom panel 22 of the housing to reduce heat loss therefrom.

When assembled, the heat-absorbing troughs are respectively mounted and supported on the engaging upper surface of the molded form 34 in a generally parallel side-by-side terraced array. The elongated heat-absorbing troughs disposed in the array extend longitudinally between the opposing side walls 18 and 20 of the housing generally parallel to one another, with each successive trough being upwardly stepped from the other in adjoining side-by-side fashion. The troughs in the array are supported and retained on the molded form 34 in position to retain liquid and with the ends 36 of the troughs proximate to side wall 20 being elevated relative to the opposing ends 38 to permit gravity flow of liquid toward the lower opposing ends 38 at a very slow rate. To enable a slow rate of liquid flow longitudinally of the trough, the upper ends 36 of the troughs disposed and supported in the array are vertically elevated with respect to a horizontal reference plane 25 of at an angle of only a few degrees, as indicated in FIG. 2 as angle $\alpha$.

The heat-absorbing troughs are upwardly terraced in side-by-side fashion so that the average slope of the vertical inclination of the terraced array relative to a horizontal reference plane 25 is approximately 30–45 degrees, as indicated in FIG. 3 as angle $\beta$. The terraced array of troughs is oriented and inclined toward the sun so that solar radiation will impinge upon the troughs.

Each trough is of similar construction having trough defining upper and lower side walls 40 and 42, with upper side wall 40 being dimensioned to extend vertically higher than the lower side wall 42 when the troughs are disposed in the array. The lower side wall 42 of each trough is also disposed at essentially the same vertical height in the assembled array as the adjoining upper wall 40 of the adjacently lower trough. The lower side wall 42 of each trough includes a flanged lip 44 which extends longitudinally along the top edge thereof. The lip 44 is U-shaped and properly shaped and dimensioned so as to overlap and snugly embrace the top edge of the adjoining and adjacent upper side wall 40 of the adjacently lower trough disposed in the array. The lip 44 is removably and functionally engageable with the top edge of the adjacent upper wall to permit the troughs to be removably mounted with respect to each other in the array. Each trough also includes a heat-absorbing surface 45 that is upwardly directed when the troughs are disposed in the array so as to absorb the solar radiation impinging on the troughs.

The solar heat collector includes feed means for introducing heat-absorbing liquid, such as water, into the respective troughs disposed in the array at the upper ends 36 thereof to produce a flow of the heat collecting liquid toward the respective lower ends. For this purpose, a fluid inlet pipe 48 having a plurality of outlet ports 50 corresponding to the respective troughs is disposed and supported slightly above the upper ends 36 of the array of troughs and within the housing parallel and proximate to the side wall 20 of the housing. The heat collecting liquid is introduced into the inlet pipe 48, as indicated by inlet arrow 55, by pump means (not illustrated) and is subsequently discharged from the outlet ports 50 into the respective upper ends of the heat-absorbing troughs disposed in the array. Regulator means can be utilized to regulate the discharge of the heat-absorbing liquid from each of the outlet ports to control the input rate of the heat-absorbing liquid into each of the troughs. By controlling the input rate, the temperature to which the heat-absorbing liquid is heated can also be controlled for more efficient operation.

From the upper ends 36 of the troughs disposed in the array, the heat-absorbing liquid flows at a very slow rate over the heat-absorbing upper surface 45 of the troughs toward the respective lower ends 38 thereof. The troughs are disposed in the array and are properly dimensioned to retain heat-absorbing liquid so that the heat-absorbing liquid which is introduced into the troughs does not cascade or overflow sidewise down the terraced array of troughs but only flows longitudinally of the respective troughs. With the terraced array of troughs being vertically inclined and oriented toward the sun, the heat-absorbing liquid becomes heated not only from the impingement of solar radiation upon the heat-absorbing liquid and the portion of the troughs beneath the liquid but also through lateral conduction of the solar radiation initially absorbed by the heat-absorbing surfaces 45 of the troughs extending above the liquid surface. The vertical inclination of the terraced array increases the efficiency of the heat absorption process since the intensity of the solar radiation impinging upon the troughs is increased over that of a horizontally disposed collector due to the increase in the angle of incidence of the impinging solar radiation.

The slow rate of flow of the heat-absorbing liquid longitudinally of the troughs also increases the efficiency of the process since the heat-absorbing liquid can be exposed to solar radiation for a relatively long time period. By increasing or decreasing the angle of vertical inclination, angle of the upper ends of the troughs with respect to the lower ends 38 thereof, the flow rate of the heat-absorbing liquid longitudinally of the troughs can be regulated so as to permit the heat-absorbing liquid to attain various desired temperatures. By controlling the imput rate of the heat-absorbing liquid into the troughs and by adjusting the longitudinal slope of the troughs, the heat-absorbing liquid can be removed from the lower ends of the troughs as soon as a selected obtainable temperature is attained. Furthermore, with the troughs arranged in the terraced array vertically inclined toward the sun and with selected ends slightly elevated relative to the opposing ends, the angle of incident solar radiation upon the troughs can be maximized while still permitting the heat-absorbing liquid to be exposed to solar radiation for an extended period of time without incurring weight problems from stagnant pools or ponds of heat-absorbing liquid.

Collection means is provided for collecting the heat-absorbing liquid from the lower ends of the troughs disposed in the array. For this purpose, an outlet conduit 58 communicating at the lower ends 38 of the respective troughs is utilized to collect the heat-absorbing fluid being discharged from the troughs at the respective lower ends 38 thereof. The outlet conduit 58 is positioned below the lower ends of the troughs generally parallel to the side wall 18 of the housing. The outlet conduit 58 is also disposed generally parallel to the bottom panel 22 of the housing and at the vertical inclination thereof so that the heat-absorbing liquid flowing into the outlet conduit from the respective troughs will be discharged from the outlet conduit due to the gravity flow of the heat-absorbing liquid through the outlet conduit, the discharge of the heat-absorbing liquid from the outlet conduit being illustrated in FIGS. 1 and 2 by flow arrow 60.

The heat-absorbing liquid discharged from the outlet conduit 58 is introduced into an appropriate storage facility (not illustrated). The heat-absorbing liquid can be reintroduced into the solar energy collector through the inlet pipe 48 as previously described. This enables recirculation of the heat-absorbing liquid for more efficient operation.

Since the heat-absorbing liquid flows longitudinally of the troughs and also flows through the outlet conduit in response to gravity, the entire system is inherently self-draining. Accordingly, since pools or ponds of heat-absorbing liquid are not permitted to accumulate or stagnate in the solar energy collector, weight and freeze-up problems associated with conventional solar collectors are eliminated.

The solar heat collector also includes reflector means such as a reflective mirror 62 removably positionable proximate to the top edge of the array of troughs generally parallel to the longitudinal direction of the troughs. The reflective mirror is supported in its position proximate to the top edge of the array by support means communicating with the housing. The reflective mirror is positioned with respect to the array of troughs to reflect incident solar radiation onto the troughs. Therefore, solar radiation that would otherwise not impinge upon the troughs is reflected by the reflective mirror onto the troughs thereby increasing the amount of solar radiation available to heat the heat-absorbing fluid.

A generally transparent cover 65, here shown to be planar, is also provided for covering the assembled array of troughs. The transparent cover can comprise multiple layers to enhance the insulative properties. The transparent cover serves a multiple purpose in that it permits solar radiation to pass therethrough to impinge upon the troughs and the heat-absorbing liquid therein while protecting the troughs from exposure to atmospheric elements such as rain and wind which would reduce the efficiency of the solar energy collector. The transparent cover also serves as insulation to reduce heat loss from the solar energy collector to the atmosphere.

The generally planar transparent cover 65 is removably positionable with respect to the housing at an angle relative to a reference plane generally parallel to the average slope of terraced array of troughs. The average slope of the terraced array of troughs is also generally parallel to the bottom panel 22 of the housing such that the average slope of the terraced array is generally equal to angle, as illustrated in FIG. 3. When in position, the cover rests upon support brackets 68 attached to the inside of the back and front walls 16 and 14 of the housing. The support brackets 68 are disposed proximate to the top edges of the front and back walls 14 and 16 of the housing and are positioned so that the cover is disposed and sloped at a steeper angle relative to the horizontal reference plane 25 than the average slope of the terraced array of troughs. The cover is preferably oriented at a steeper slope than the terraced array of troughs to minimize the reflective losses of solar radiation.

Finally, while certain preferred embodiments of the present invention have been illustrated and described, it is to be understood that certain variations and combinations and subcombination with each other may be made by a person skilled in the art within the scope of the following claims.

What is claimed is:

1. A solar heat collector comprising:
   A. a plurality of elongated heat-absorbing troughs;
   B. support means for supporting said troughs in a generally parallel adjoining side-by-side terraced array, in position to guide a liquid flow to prevent pools of heat-absorbing liquid from forming in the troughs, and with an end of each trough elevated longitudinally and displaced laterally relative to the other end of the trough to permit a continuous liquid flow by gravity toward and out of the respective lower ends thereof;
   C. feed means for introducing heat-absorbing liquid into said troughs disposed in said array at the upper ends thereof to permit a flow of the heat-absorbing liquid toward the respective lower ends; and
   D. collection means for collecting the heat-absorbing liquid from said troughs disposed in said array at the lower ends thereof.

2. The solar heat collector in accordance with claim 1 wherein each trough is a separate unit removably engageable with said support means to permit each trough to be removably positionable in said array.

3. A solar heat collector comprising:
   A. a plurality of elongated heat-absorbing troughs;
   B. support means for supporting said troughs in a generally parallel side-by-side terraced array, in position to retain liquid and with an end of each trough elevated relative to the other end to permit a liquid flow by gravity toward the respective lower ends thereof wherein each trough is a separate unit having at least a part removably engageable with a part of an adjacent trough to permit said troughs to be removably mounted with respect to each other on said support means in said array;
   C. feed means for introducing heat-absorbing liquid into said troughs disposed in said array at the upper ends thereof to permit a flow of the heat-absorbing liquid toward the respective lower ends; and
   D. collection means for collecting the heat-absorbing liquid from said troughs disposed in said array at the lower ends thereof.

4. The solar heat collector in accordance with claim 3 wherein each of said troughs is of similar construction having trough defining sidewalls, one wall being dimensioned to extend vertically higher than the other in said array, in supported position with edges of adjacent walls of adjacent troughs in said array being supported at essentially the same vertical height, at least one of said walls having a flanged lip extending longitudinally along the top edge thereof, said lip being of such shape and dimension as to overlap and snugly embrace the top edge of the adjacent wall of an adjacent trough in said array, said lip being removably and functionally engageable therewith.

5. The solar heat collector in accordance with claim 4 wherein the lower wall of each trough in said array is provided with said lip, and wherein further the lower wall of each trough in said array is disposed to enable said lip to overlap and engage the adjoining upper wall of the adjacently lower trough in said array.

6. A solar heat collector in accordance with claim 1 further comprising a generally planar transparent cover for covering said array of troughs, said covering being removably positionable with respect to said support means at an angle relative to a reference plane generally parallel to said array.

7. A solar heat collector in accordance with claim 1 further comprising reflector means positionable at an orientation with respect to said array for reflecting incident radiation onto said trough.

8. A solar heat collector in accordance with claim 7 wherein said reflector means comprises a reflective mirror positionable with respect to said support means proximate to the top edge of said array, said mirror being disposed generally parallel to the longitudinal direction of said troughs.

9. A solar heat collector comprising:
   A. at least one elongated heat-absorbing trough;
   B. support means for supporting said trough in a position to guide a liquid flow to prevent pools of heat-absorbing liquid from forming in the trough, and with one end of the trough elevated longitudinally and displaced laterally relative to the other end of the trough to permit a continuous liquid flow by gravity toward and out of the lower end thereof, said trough being removably engageable with said support means;

C. feed means for introducing heat-absorbing liquid into the support trough at the upper end thereof to permit a flow of the heat-absorbing liquid toward the lower end; and D. collection means for collecting the heat-absorbing liquid from the supported trough at the lower end thereof.

* * * * *

UNITED STATES PATENT AND TRADEMARK OFFICE
CERTIFICATE OF CORRECTION

PATENT NO. : 4,446,852

DATED : May 8, 1984

INVENTOR(S) : William H. Steigelmann

It is certified that error appears in the above-identified patent and that said Letters Patent is hereby corrected as shown below:

In the Specification:

Column 2, line 68, after "elevated" insert --longitudinally and displaced laterally--.

Column 3, line 1, after "38" insert --of the troughs--.

Column 4, line 19, after "angle" insert --α--.

Column 5, line 37, after "angle" insert --β--.

Signed and Sealed this

Sixth Day of November 1984

[SEAL]

Attest:

GERALD J. MOSSINGHOFF

Attesting Officer

Commissioner of Patents and Trademarks